United States Patent [19]
Finkowski et al.

[11] Patent Number: 6,041,912
[45] Date of Patent: *Mar. 28, 2000

[54] APPARATUS AND METHOD FOR HANDLING DOUGH PIECES

[75] Inventors: James W. Finkowski, Andover; Robert F. Meyer, Maple Grove; Dale W. Fredrickson, Lindstrom; Dennis B. Usgaard, New Hope; Manuel Motolina, Minneapolis, all of Minn.

[73] Assignee: The Pillsbury Company, Minneapolis, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/933,590

[22] Filed: Sep. 19, 1997

[51] Int. Cl.[7] .................................................. B65G 47/31
[52] U.S. Cl. ...................... 198/461.2; 99/443 C; 426/496
[58] Field of Search ............................ 198/461.2, 461.3, 198/448, 449, 452, 447; 99/443 C, 386; 426/496

[56] References Cited

U.S. PATENT DOCUMENTS

| | | | |
|---|---|---|---|
| 2,315,670 | 4/1943 | Tascher et al. | 198/32 |
| 2,450,033 | 9/1948 | Cohen | 107/4 |
| 2,897,947 | 8/1959 | Krupp et al. | 198/28 |
| 3,219,167 | 11/1965 | Boinnard | 198/32 |
| 3,250,372 | 5/1966 | Wagner et al. | 198/30 |
| 3,268,057 | 8/1966 | Ross et al. | 198/33 |
| 3,324,987 | 6/1967 | Kiesser . | |
| 3,714,948 | 2/1973 | Sears et al. | 130/5 R |
| 3,741,371 | 6/1973 | Oldershaw et al. | 198/38 |
| 3,811,550 | 5/1974 | Ajero | 198/272 |
| 4,056,187 | 11/1977 | Ajero | 198/394 |
| 4,201,285 | 5/1980 | Chamberlain | 198/400 |
| 4,211,055 | 7/1980 | Long et al. | 53/517 |
| 4,225,031 | 9/1980 | Frisbie et al. | 198/395 |
| 4,413,722 | 11/1983 | Frisbie et al. | 198/392 |
| 4,546,870 | 10/1985 | Cogo | 198/400 |
| 4,931,131 | 6/1990 | Thompson | 156/556 |

FOREIGN PATENT DOCUMENTS 1122251  5/1956  France .

OTHER PUBLICATIONS

Brochure: "Super Cutter—Automatic Corn Orienter Cutter Feeder", Computer Controlled Machines of Minnesota, Inc., 1990.

Brochure: "Premium Selection System—Vision Inspection, Size Grading and Cutting", Computer Controlled Machines of Minnesota, Inc., 1991.

Primary Examiner—William E. Terrell
Assistant Examiner—Mark A. Deuble
Attorney, Agent, or Firm—Westman, Champlin & Kelly, P.A.

[57] ABSTRACT

An apparatus and a method for dough handling includes a first conveyor for receiving dough and having a first discharge end for discharging dough. A second conveyor receives dough and is positioned along side the first conveyor to convey in the direction of the first conveyor. The second conveyor has a second discharge end that is spaced-apart from the first discharge end. The first and second conveyors can be used to separate dough pieces from an elongated dough product such as a roll and/or phase individual dough pieces to provide them in succession for packaging or further processing.

12 Claims, 4 Drawing Sheets

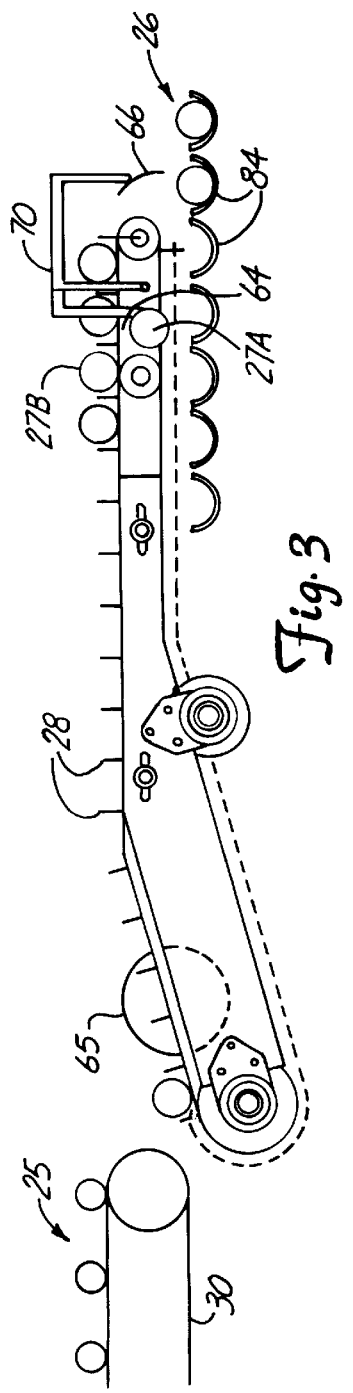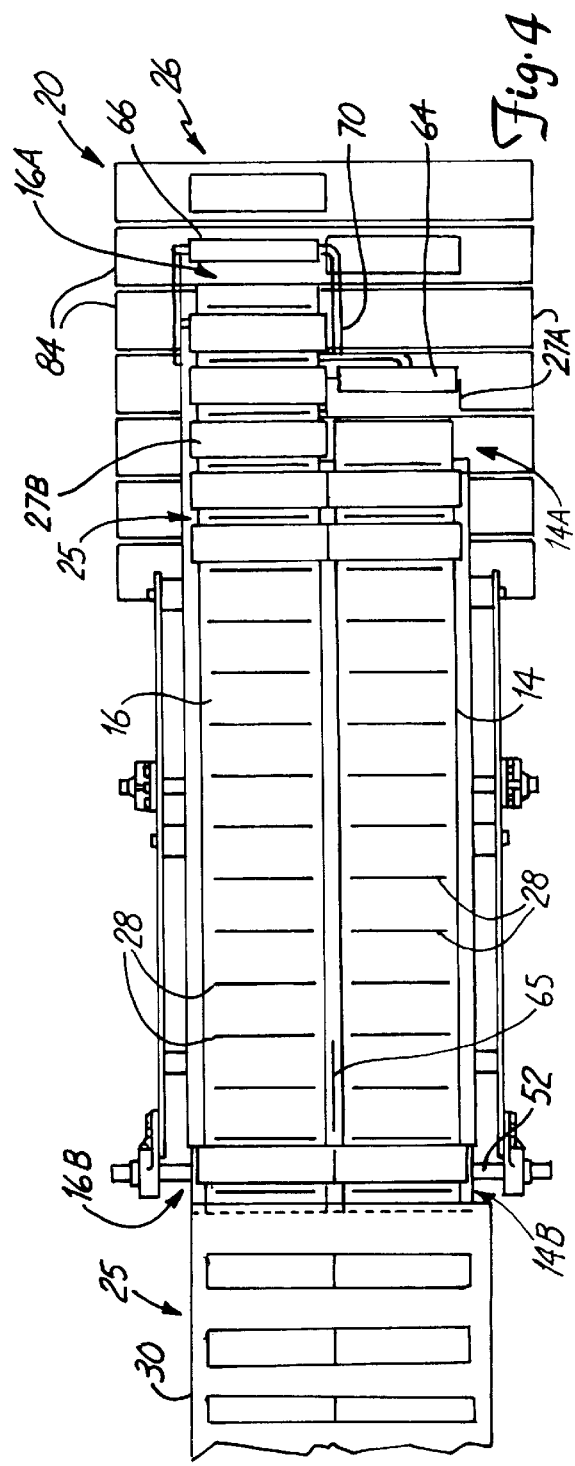

APPARATUS AND METHOD FOR HANDLING DOUGH PIECES

BACKGROUND OF THE INVENTION

The present invention relates to continuous dough processing lines. More particularly, the present invention relates to an apparatus and a method for separating and repositioning dough pieces prepared by the continuous dough processing line.

Automated dough processing lines for forming a continuous dough strip that is prepared into individual dough pieces are well known. A typical dough processing line includes a dough mixer for mixing together primary elements of the dough such as flour, water, sugar and the like. A sheeter receives the mixed dough which is then conveyed to a series of rollers. The rollers roll the dough into a web of dough having generally uniform thickness. Folders, lappers, and other rollers are typically used to further process the sheet of dough to obtain a continuous sheet to have selected characteristics and physical dimensions.

When rolled dough products such as cinnamon rolls, jelly rolls or the like are made, the continuous sheet of dough is cut into rectangular portions that are separated from each other by accelerating conveyors. The rectangular dough sheets are then rolled-up with rolling-up devices such as a flexible chain blanket. The chain blanket is supported at one end, being suspended over the conveyor. As the rectangular dough sheet engages the loose end of the chain blanket, the dough sheet portions are rolled-up because the chain blanket drags thereon.

Once an elongated dough product has been formed, it is typically separated into individual pieces for packaging. An apparatus for inserting dough into containers is described in U.S. Pat. No. 3,458,970 to Reid et al. In particular, Reid et al. disclose an endless loading conveyor having pivotal guiding spoons. A container dispenser provides containers to the loading conveyor which includes a provision for supporting the containers in position to receive the dough pieces from the spoons. With the containers in position, the spoons are tilted to transfer the dough pieces by gravity from the spoons to the containers.

There is an ongoing need for improved apparatuses and methods of packaging individual dough pieces. Given an elongated dough product such as an elongated roll, there is a need to separate the elongated dough product into pieces and/or reposition them in succession so that they can be deposited individually in packages.

SUMMARY OF THE INVENTION

An apparatus and a method for dough handling includes a first conveyor for receiving dough having a first discharge end for discharging dough. A second conveyor receives dough and is positioned along side the first conveyor to convey in the direction of the first conveyor. The second conveyor has a second discharge end that is spaced-apart from the first discharge end. The first and second conveyors can be used to separate dough pieces from an elongated dough product such as a roll and/or phase individual dough pieces to provide them in succession for packaging or further processing.

BRIEF DESCRIPTION OF THE DRAWINGS

FIG. 3 is an enlarged schematic side elevational view of the present invention.

FIG. 4 is an enlarged schematic top plan view of the present invention.

DETAILED DESCRIPTION OF THE PREFERRED EMBODIMENTS

Figure 1:
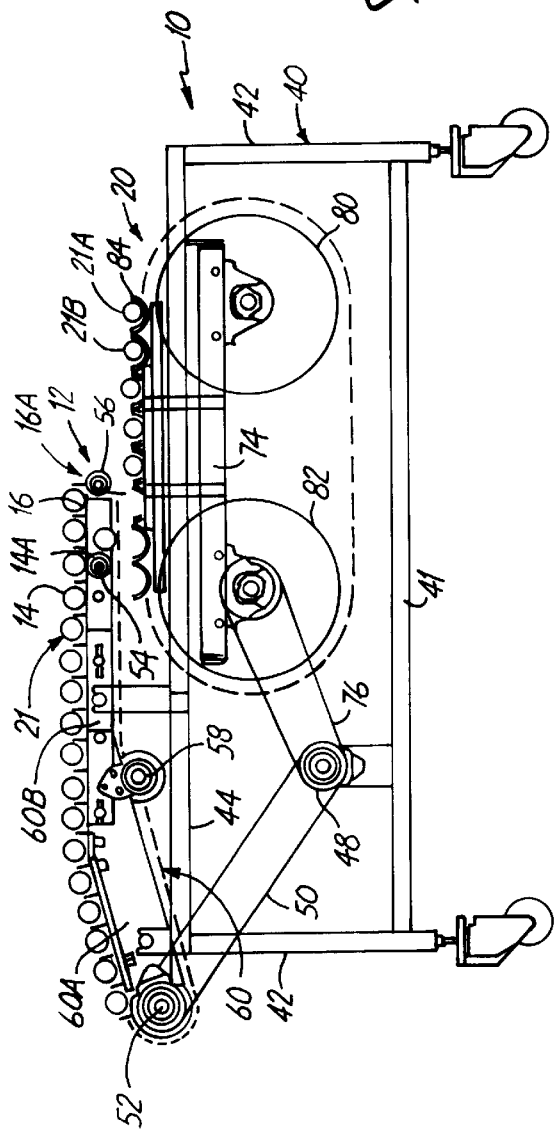
FIG. 1 is a side elevational view of an apparatus constructed in accordance with the present invention, being somewhat schematic and with parts removed.
Figure 2:
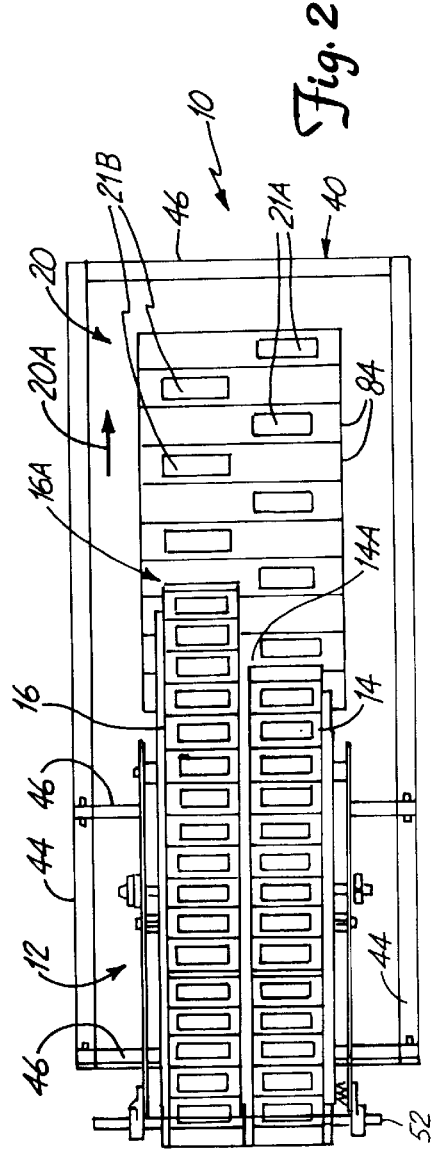
FIG. 2 is a top plan view of the apparatus of FIG. 1.

FIGS. 1 and 2 illustrate an embodiment of a dough handling machine 10 of the present invention. Generally, the dough handling machine 10 includes a conveyor assembly 12 having a first conveyor 14 and a second conveyor 16. As illustrated, the second conveyor 16 is positioned along side the first conveyor 14 to convey in a direction parallel to the first conveyor 14. The first conveyor 14 includes a discharge end 14A, while the second conveyor 16 has a discharge end 16A that is spaced-apart from the first discharge end 14A in the conveying direction. The spaced-apart discharge ends 14A and 16A allow the conveyor assembly 12 to perform two separate functions. First, the spaced-apart ends 14A and 16A allow side-by-side dough products 21 to be placed on the conveyor assembly 12 and "phased", wherein the dough products 21 are repositioned and generally follow each other in succession in a conveying direction 20A on a third conveyor 20. In the embodiment illustrated, the third conveyor 20 is positioned below the discharge ends 14A and 16A to receive the dough products 21 therefrom. Although the dough products 21 are conveyed on the first conveyor 14 and the second conveyor 16 in a side-by-side relationship, the dough products 21 are phased in succession on the third conveyor 20 because the dough products 21 are dropped from the conveyors 14 and 16 at different times. Preferably, the third conveyor 20 has a lateral speed greater than the lateral speed of the first conveyor 14 and the second conveyor 16 so that dough products 21B discharged from the second discharge end 16A fall between dough products 21A discharged from the first discharge end 14A. If desired, the third conveyor 20 can be operated at the same speed or a slower speed than the first conveyor 14 and the second conveyor 16.

Secondly, the spaced-apart relationship of the discharge ends 14A and 16A also can be used to separate individual dough pieces from a common elongated dough product. Referring to FIG. 4, the first conveyor 14 and the second conveyor 16 are positioned sufficiently close enough to each other such that elongated dough products 25 can span across and are supported on each of the conveyors 14 and 16. The elongated dough products 25 can be deposited on the conveyor assembly 12 at ends 14B and 16B, which can be aligned with each other. Thus, in the embodiment illustrated, the first conveyor 14 is shorter than the second conveyor 16 due to the spaced-apart relationship of discharge ends 14A and 16A. The conveyor assembly 12 transports the elongated dough products 25 toward the discharge ends 14A and 16A wherein conveyors 14 and 16 rotate at the same speed to have the same conveying velocities. In a preferred embodiment, each of the conveyors 14 and 16 include spaced-apart dividers 28 or other similar devices that separate the elongated dough products 25 from each other, which are dropped onto the conveyor assembly 12 in succession from a dough processing line 30. The conveyor assembly 12 separates the elongated dough products 25 into individual dough pieces 26 when the elongated dough products 25 reach the first discharge end 14A whereat a first individual dough piece 27A separates from a second individual dough piece 27B and is dropped onto the third conveyor 20. The second individual dough piece 27B then continues to travel on the second conveyor 16 to the second discharge end 16A whereat it is dropped subsequently onto the third conveyor 20. As discussed above, in one embodiment, the third conveyor 20 can move at a lateral speed faster than the lateral speed of the first conveyor 14 and the second conveyor 16 to separate the individual dough pieces 26 from each other in the conveying direction of the third conveyor 20.

Referring back to FIGS. 1 and 2, the dough handling machine 10 includes a support frame 40 having lower rails 41, upstanding support members 42, upper rails 44 and cross-members 46 (illustrated in FIG. 2). A motor 48 drives the conveyor assembly 12 with a drive belt 50. As stated above, the first conveyor 14 and the second conveyor 16 are preferably driven at the same lateral speed. In the embodiment illustrated, the drive belt 50 drives a common drive shaft 52 that is operably coupled to the first conveyor 14 and the second conveyor 16. Other drive devices can be used, for instance, separate motors can be provided for each of the conveyors 14 and 16. The conveyors 14 and 16 rotate about guide rollers 54 and 56 at the discharge ends 14A and 16A, respectively. An intermediate guide assembly 58 is provided between the common drive shaft 52 and the guide rollers 54 and 56. The conveyor assembly 12 includes a support frame indicated generally at 60. In the embodiment illustrated, the support frame 60 includes an inclined portion 60A and a horizontal portion 60B. The inclined portion 60A allows the conveyor assembly 12 to be positioned below an end of the dough processing line 30 (FIGS. 3 and 4) to receive the elongated dough products 25 to be separated and/or have individual dough pieces 21 placed in succession on the third conveyor 20. Although illustrated wherein the conveyor assembly 12 and the third conveyor 20 are driven from the motor 48, the conveyor assembly 12 and the third conveyor 20 can be separate, stand-alone machines.

The dough processing line 30 can produce rolled dough products such as cinnamon rolls, jelly rolls or the like. Individual dough pieces 26 can be obtained from the elongated dough products 25. Preferably, the elongated dough products 25 are cut or sliced all the way through, scored or include other suitable perforations to allow the elongated dough products 25 to be easily separated. If desired, a suitable cutting device such as a rotating blade 65 (FIGS. 3 and 4) can be located between the conveyors 14 and 16 to cut the elongated dough products 25. Other cutting devices such as a water jet could also be used.

If desired, the elongated dough products 25 can be separated prior to depositing individual dough pieces 21 on the conveyor assembly 12. In this manner, the conveyor assembly 12 is used only for properly placing the individual dough pieces 21 in succession on the third conveyor 20. Referring to FIG. 3, deflectors 64 and 66 positioned at discharge ends 14A and 16A can be used to further ensure proper placement of the dough pieces on the third conveyor 20. For uncooked rolled dough pieces, the deflectors 64 and 66 help to control rotation as the dough pieces are dropped in order to retain the coiled form of the dough pieces. For example, too much rotation can cause the dough piece to unroll. The deflectors 64 and 66 are supported with a suitable structure 70, for example, secured to the support frame 60.

Figure 7:
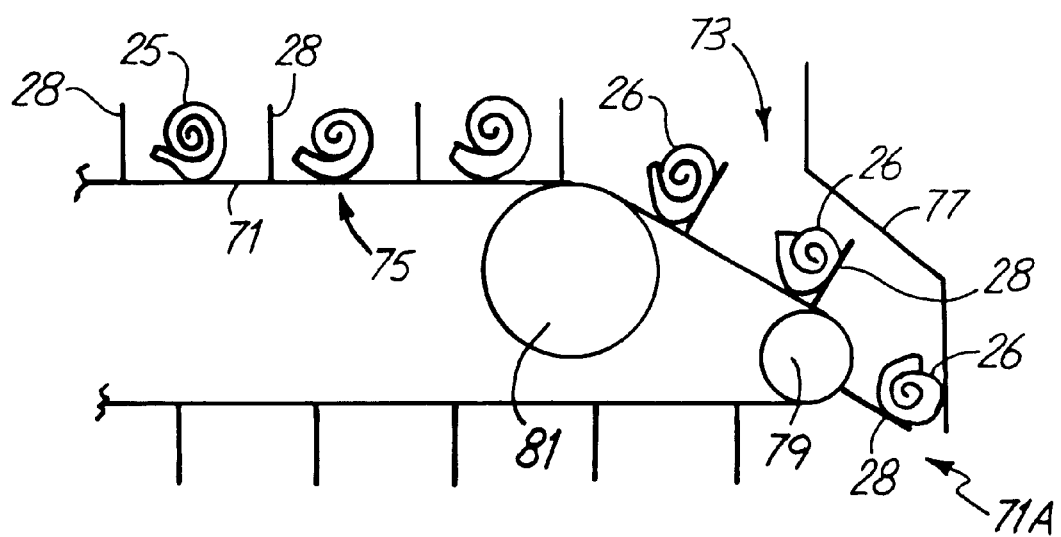
FIG. 7 is a schematic side elevational view of a discharge end.

FIG. 7 schematically illustrates a portion of a conveyor 71 having a discharge end 71A. The conveyor 71 is similar to the conveyors 14 and 16 described above; however, the discharge end 71A includes a declining portion 73 just before the point at which dough pieces are dropped from the conveyor 71. The conveyor 71 includes the spaced-apart dividers 28, which separate the elongated dough products 25 from each other. (Of course, the conveyor 71 and the discharge end 71A can also be used for previously separated dough pieces 21.) The declining portion 73 helps locate each of the dough pieces to be dropped from the discharge end 71A in a predetermined position such that each dough piece can be accurately dropped, for example, in the selected spoon 84 of the third conveyor 20. In particular, as the conveyor 71 travels across a substantially horizontal portion or level portion 75 to the declining portion 73, elongated dough products 25 are separated into dough pieces 26 and each of the dough pieces 26 rolls forward to engage one of the adjacent spaced-apart dividers 28 as illustrated. A deflector 77 is positioned adjacent the discharge end 71A so that the dough pieces 26 do not roll off the end of the divider 28 as the conveyor 71 rotates about a guiding device, such as an end roller 79. The deflector 77 temporarily traps or pins each of the dough pieces 26 and ensures that each of the dough pieces 26 drop substantially straight down onto the third conveyor 20 at the appropriate time. A large roller 81 or other similar guiding structure can be used at the point where the conveyor 71 traverses from the substantially horizontal portion 75 to the declining portion 73.

Figure 5:
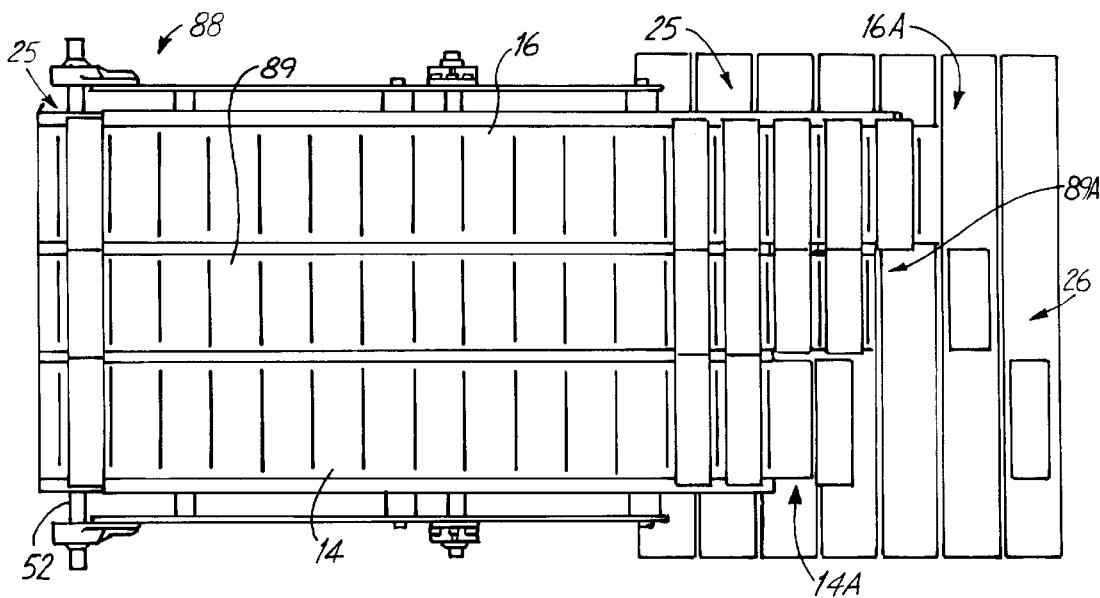
FIG. 5 is an enlarged schematic top plan view of a second embodiment of the present invention.

In the embodiment illustrated in FIG. 1, the third conveyor 20 is supported from the support frame 40 on support rails 74. The third conveyor 20 can be driven by the motor 48 through a drive belt 76. Guide wheels 80 and 82 are supported for rotation on the support rails 74 and rotate the third conveyor 20 underneath the discharge ends 14A and 16A. In a preferred embodiment, the third conveyor 20 includes tilting or pivotal spoons 84 which receive the individual dough pieces 21 and 26 from the discharge ends 14A and 16A. As described in U.S. Pat. No. 3,458,970 to Reid et al., which is incorporated by reference in its entirety, the spoons 84 pivot upwardly after receiving the individual dough pieces 21 and 26 to load the dough pieces 21 and 26 into containers. Although illustrated wherein two conveyors 14 and 16 provide dough pieces 21 and 26 to the third conveyor 20, three or more conveyors can also be used to separate and/or provide dough pieces in succession to the third conveyor 20. FIG. 5 illustrates a conveyor assembly 88 having three conveyors, wherein a conveyor 89 is positioned between the conveyors 14 and 16. The conveyor 89 has a discharge end 89A spaced-apart from the discharge ends 14A and 16A and is driven by the shaft 52 at the same lateral speed as the conveyors 14 and 16.

Figure 6:
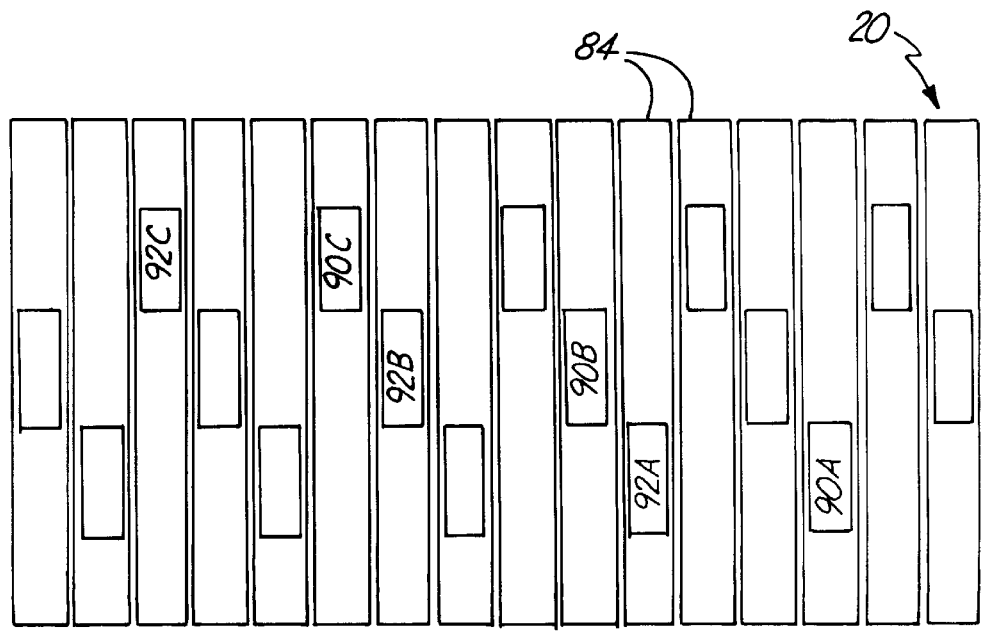
FIG. 6 is a diagrammatic view illustrating one of method of placement of individual dough pieces.

FIG. 6 diagrammatically illustrates one method of placing individual dough pieces in succession on the third conveyor 20. In the method shown, individual dough pieces 90A, 90B and 90C were obtained from a single elongated dough product distributed by the conveyor assembly 88 of FIG. 5, while individual dough pieces 92A, 92B and 92C were obtained from another elongated dough product immediately following the elongated dough product for pieces 90A–90C. Although the individual dough pieces 90A–92C can be dropped successively onto the third conveyor 20 where the individual dough pieces 92A–92C are grouped together and follow the dough pieces 90A–90C, which are also grouped together, separation of the individual dough pieces in the manner such as illustrated in FIG. 6 helps ensure accurate placement of each individual dough piece on the third conveyor 20 since all of the dough pieces from a common elongated dough product are not dropped in rapid succession.

Desired spacing of the individual dough pieces on the third conveyor 20 is obtained by varying the lateral speeds of the conveyor assembly 88 and the third conveyor 20 as well as the spacing between the discharge ends 14A, 16A and 89A of the conveyor assembly 88. The following equation provides one method for calculating the distance between the discharge ends given the desired spacing between the individual dough pieces as represented by the pitch of the spoons 84 and the lateral speed of the conveyor assembly 88 and the third conveyor 20.

$$X_C = \frac{L * A * (C + 1)}{\left[\frac{V_{20}}{V_{12}} - 1\right]}$$

where
- L=Conveyor Extension (from a Reference Conveyor, e.g. Conveyor 14);
- A=Distance Between Dough Pieces on Conveyor 20 (Pitch of Spoons 84);
- C=Number of Dough Pieces Obtained from an Elongated Dough Product;
- $V_{20}$=Lateral Speed of Conveyor 20; and
- $V_{12}$=Lateral Speed of Conveyor Assembly 88.

Thus, using the discharge end 14A as a reference, the distance between the discharge end 14A and the discharge end 89A is obtained when L equals 1 and C equals 3, while the distance between the discharge end 14A and the discharge end 16A is calculated when L equals 2 and C equals 3.

In the embodiment illustrated, the desired distance between the individual dough pieces is equal to the pitch of the spoons 84 in order for the dough pieces to fall thereon. Other types of conveyors, such as a flat conveyor, can also receive the dough pieces, if desired.

Although the present invention has been described with reference to preferred embodiments, workers skilled in the art will recognize that changes may be made in form and detail without departing from the spirit and scope of the invention.

What is claimed is:

1. A method for separating an elongated dough product into separate pieces, the method comprising the steps of:
    depositing the elongated dough product onto a conveyor assembly across a first conveyor and a second conveyor positioned along side the first conveyor, the second conveyor having a discharge end spaced-apart from a discharge end of the first conveyor;
    conveying the elongated dough product on the first and second conveyors to the discharge ends; and
    separating a portion of dough from the elongated dough product when the elongated dough product reaches the discharge end of the first conveyor.

2. The method of claim 1 and further comprising driving the first conveyor and the second conveyor so as to have the same lateral speed.

3. The method of claim 2 and further comprising depositing separated pieces of the elongated dough product from the first and second conveyors onto a third conveyor positioned below the discharge ends.

4. The method of claim 3 and further comprising driving the third conveyor at a speed greater than the first and second conveyors.

5. The method of claim 4 wherein the step of depositing includes depositing successive dough pieces from the first conveyor between successive dough pieces from the second conveyor.

6. A method for phasing dough pieces comprising the steps of:
    depositing an elongated dough product onto a conveyor assembly across a first conveyor and a second conveyor positioned along side the first conveyor, the second conveyor having a discharge end spaced-apart from a discharge end of the first conveyor, and wherein each elongated dough product spans across the first and second conveyor;
    conveying the elongated dough product on the first and second conveyors to the discharge ends;
    separating a portion of dough from the elongated dough product when the elongated dough product reaches the discharge end of the first conveyor;
    discharging the portion of dough from the discharge end of the first conveyor onto a third conveyor;
    conveying the portion of dough from the first conveyor on the third conveyor at a speed faster than the first and second conveyors; and
    discharging a second portion of dough of the elongated dough product from the discharge end of the second conveyor onto the third conveyor.

7. The method of claim 6 and further comprising deflecting the dough portions as they are discharged from the discharge ends.

8. The method of claim 6 wherein the step of conveying the dough product on the first and second conveyors is at the same lateral speed.

9. The method of claim 6 and further comprising controlling rotation of the dough portions as they are discharged from the discharge ends.

10. A method for phasing dough pieces comprising the steps of:
    depositing at least partially attached dough pieces onto a conveyor assembly across a first conveyor and a second conveyor positioned along side the first conveyor, the second conveyor having a discharge end spaced-apart from a discharge end of the first conveyor;
    conveying the dough pieces on the first and second conveyors to the discharge ends;
    discharging a dough piece from the discharge end of the first conveyor onto a third conveyor;
    conveying the dough piece from the first conveyor on the third conveyor at a speed faster than the first and second conveyors; and
    discharging a dough piece from the discharge end of the second conveyor onto the third conveyor.

11. The method of claim 10 and further comprising deflecting the dough pieces as they are discharged from the discharge ends.

12. The method of claim 10 and further comprising controlling rotation of the dough pieces as they are discharged from the discharge ends.

* * * * *